Figure 6:
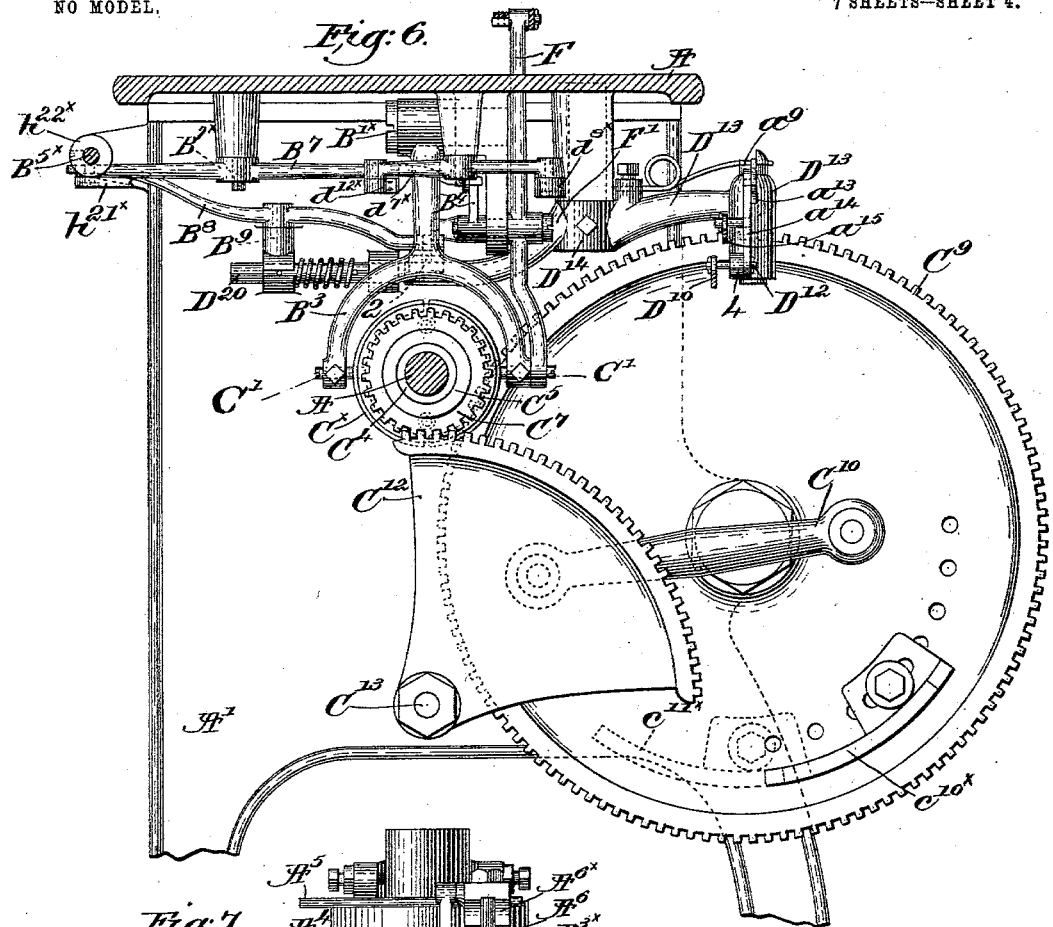

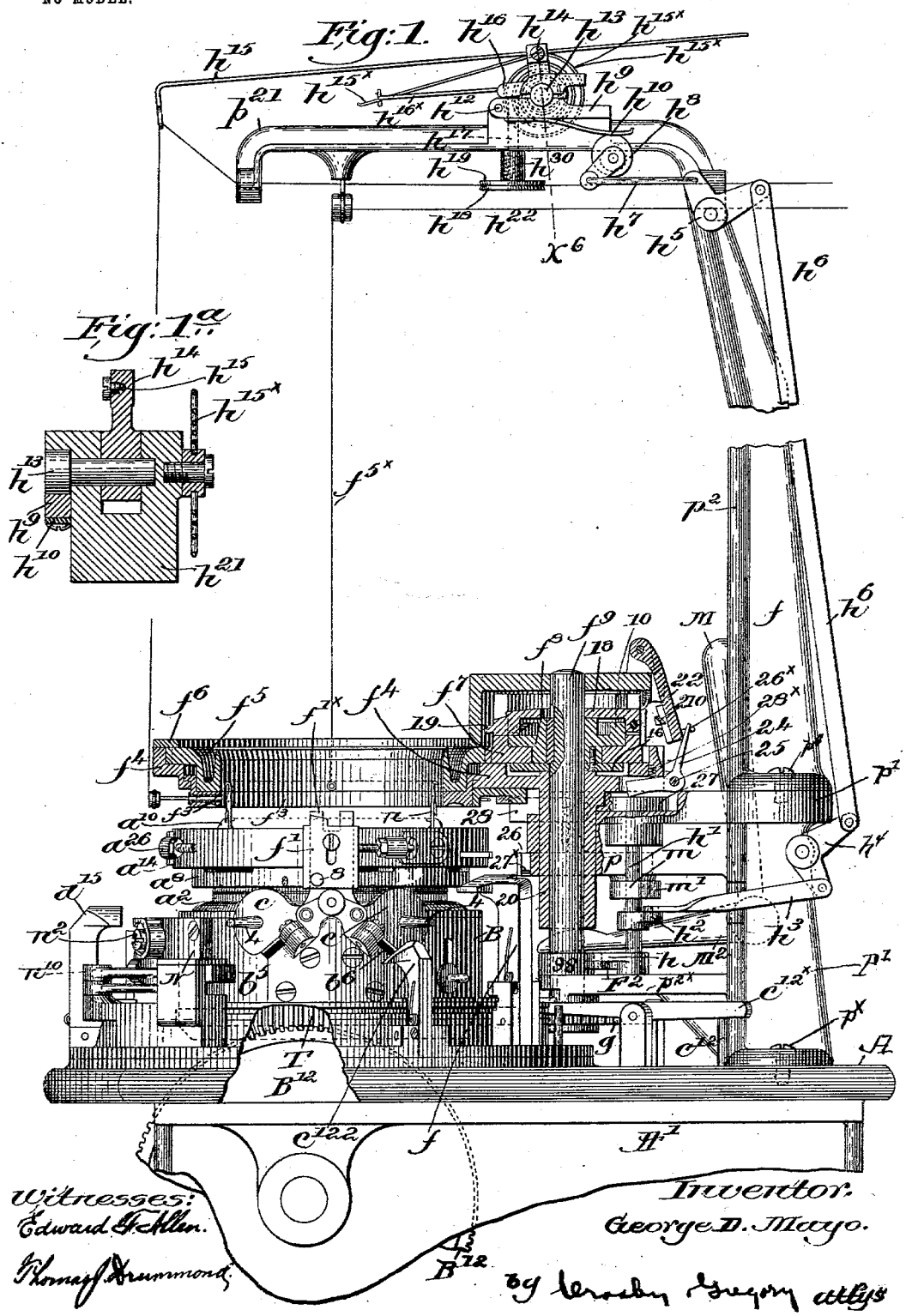

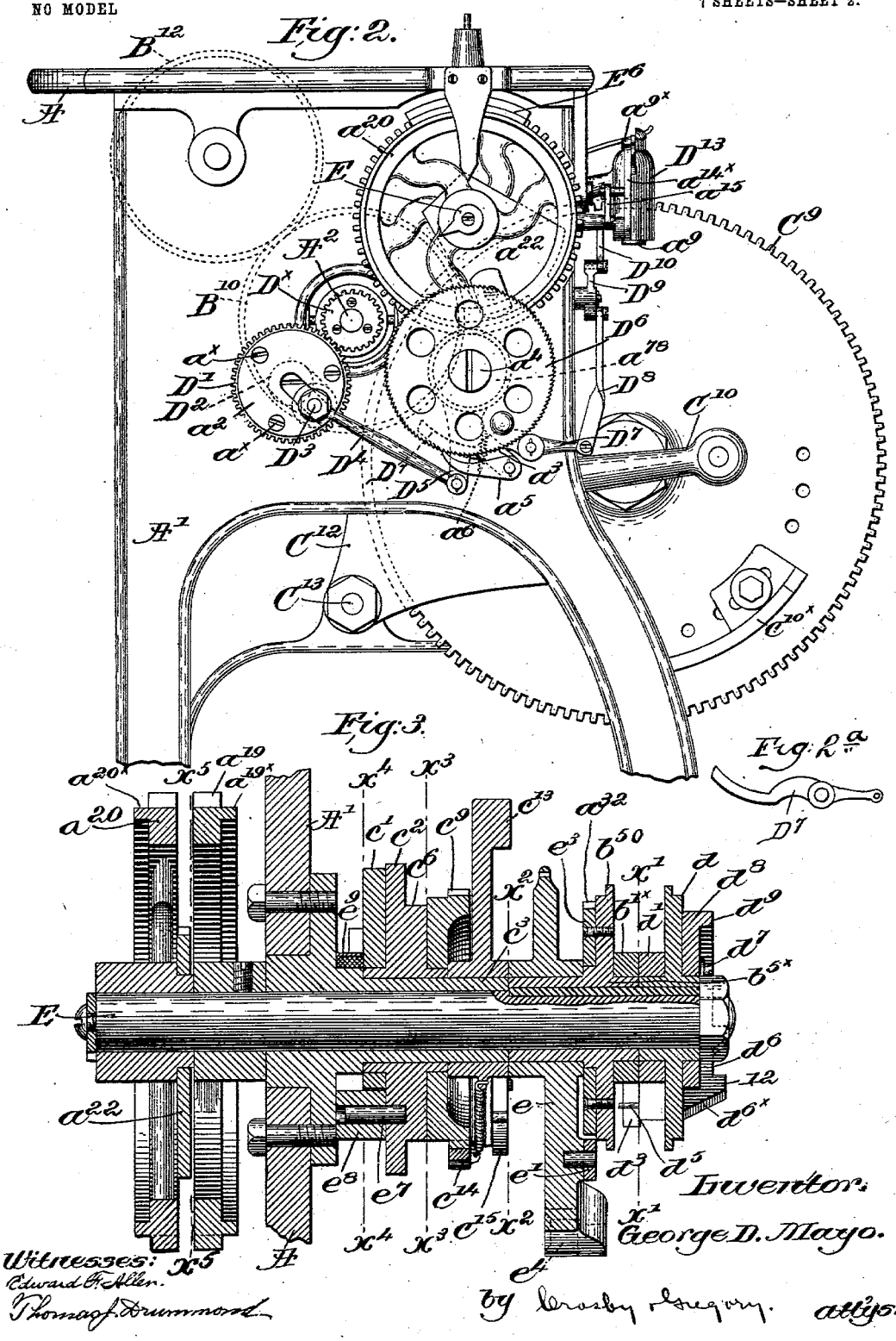

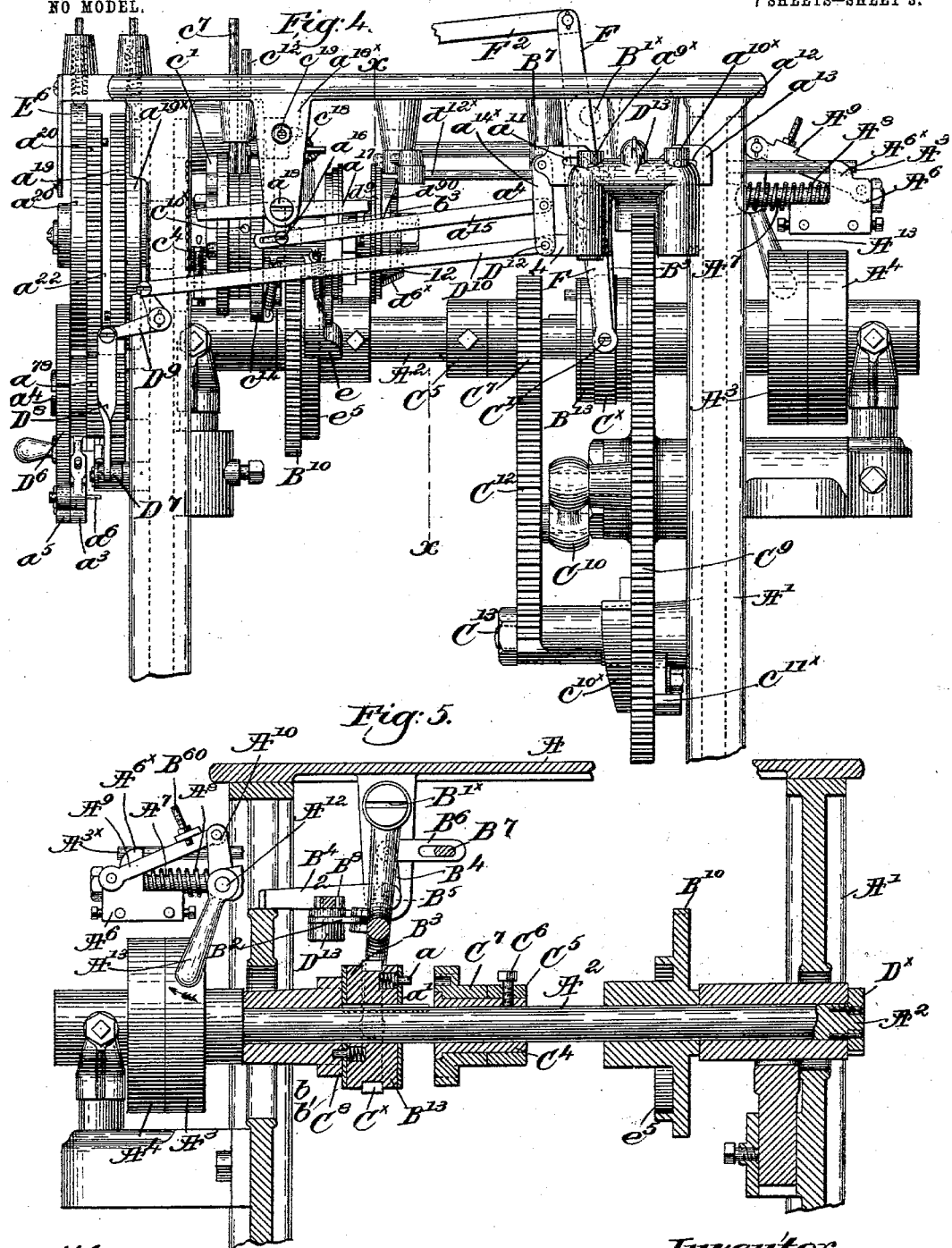

No. 745,449. PATENTED DEC. 1, 1903.
G. D. MAYO.
KNITTING MACHINE.
APPLICATION FILED AUG. 24, 1896.
NO MODEL. 7 SHEETS—SHEET 4.

Witnesses:
Edward F. Allen.
Thomas J. Drummond.

Inventor
George D. Mayo.
by Crosby & Gregory attys.

No. 745,449. PATENTED DEC. 1, 1903.
G. D. MAYO.
KNITTING MACHINE.
APPLICATION FILED AUG. 24, 1896.
NO MODEL. 7 SHEETS—SHEET 5.
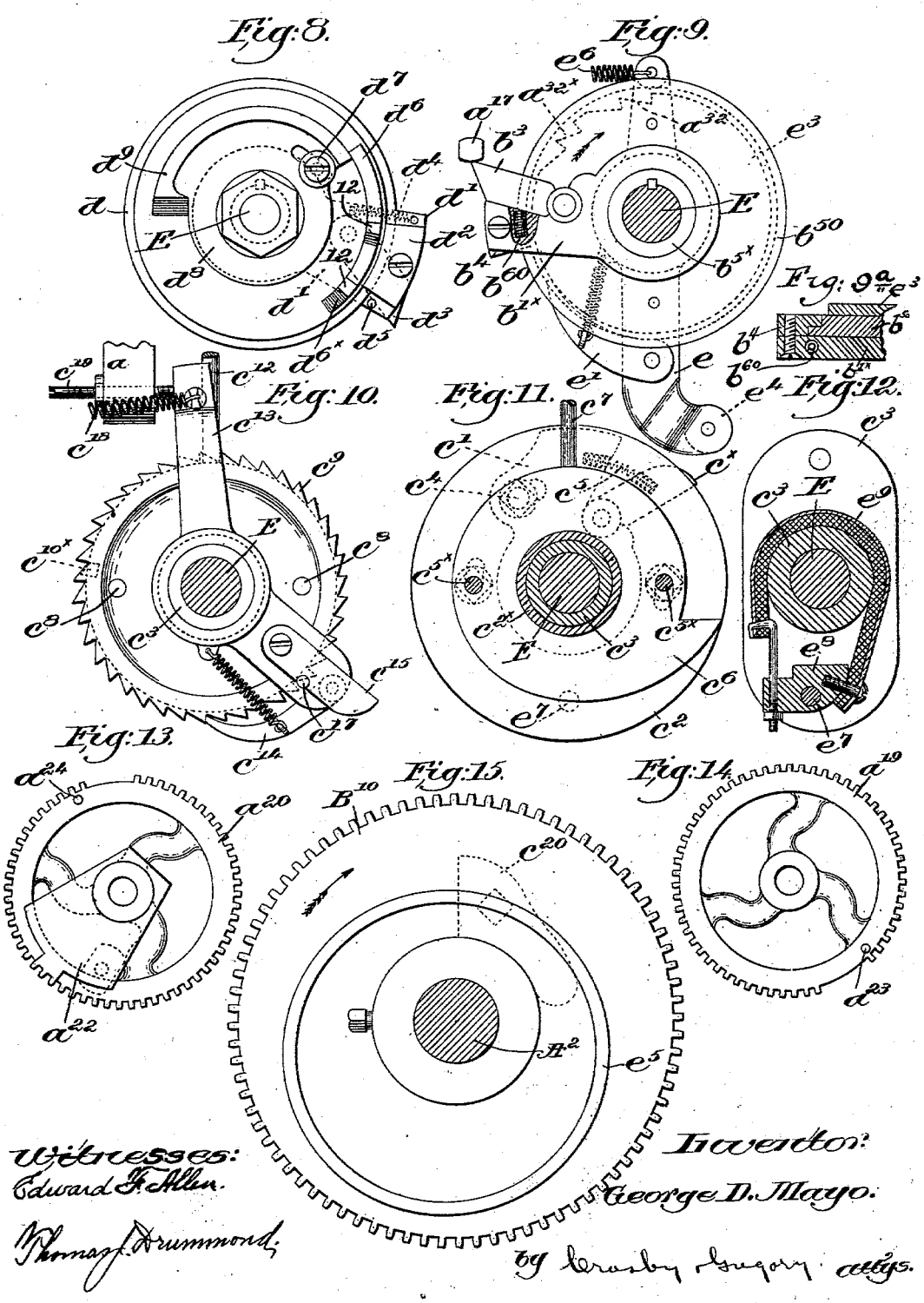
Witnesses:
Edward F. Allen
Thomas J. Drummond
Inventor:
George D. Mayo.
by Crosby Gregory attys.

No. 745,449. PATENTED DEC. 1, 1903.
G. D. MAYO.
KNITTING MACHINE.
APPLICATION FILED AUG. 24, 1896.
NO MODEL. 7 SHEETS—SHEET 6.
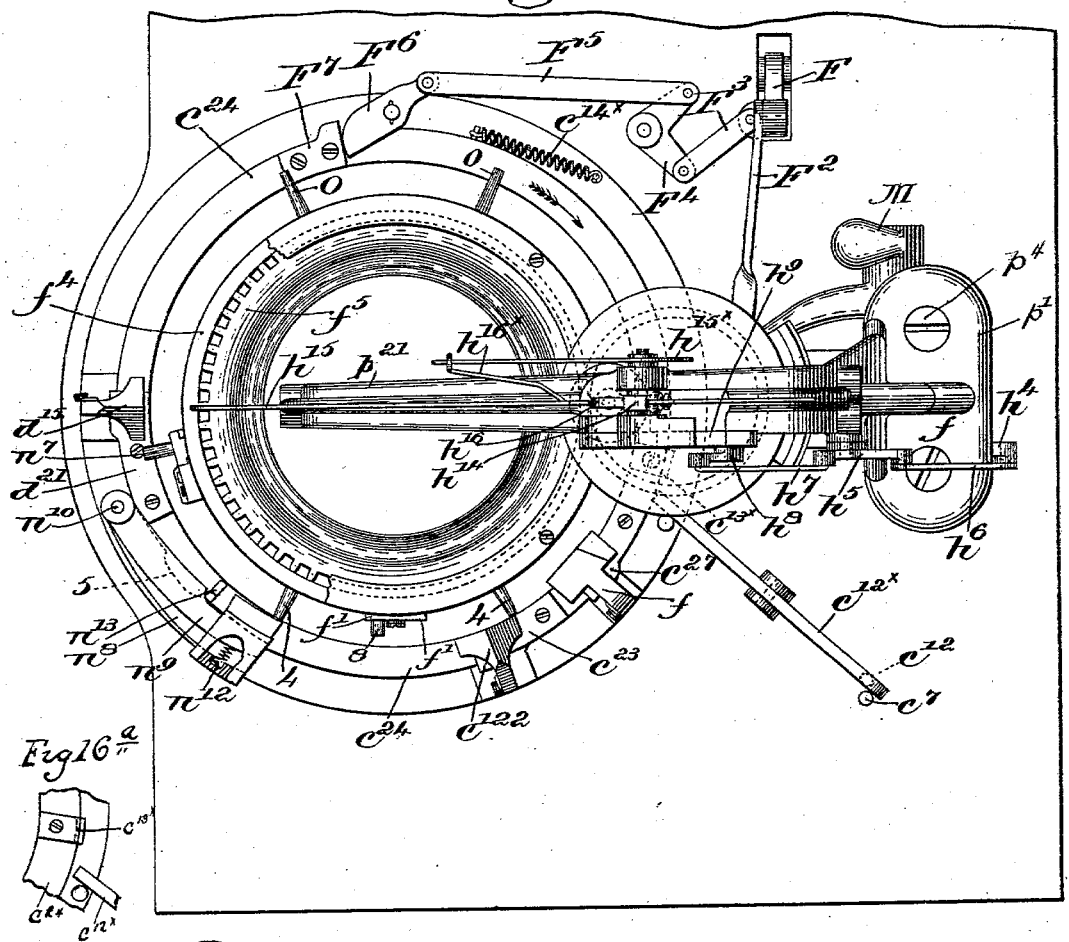
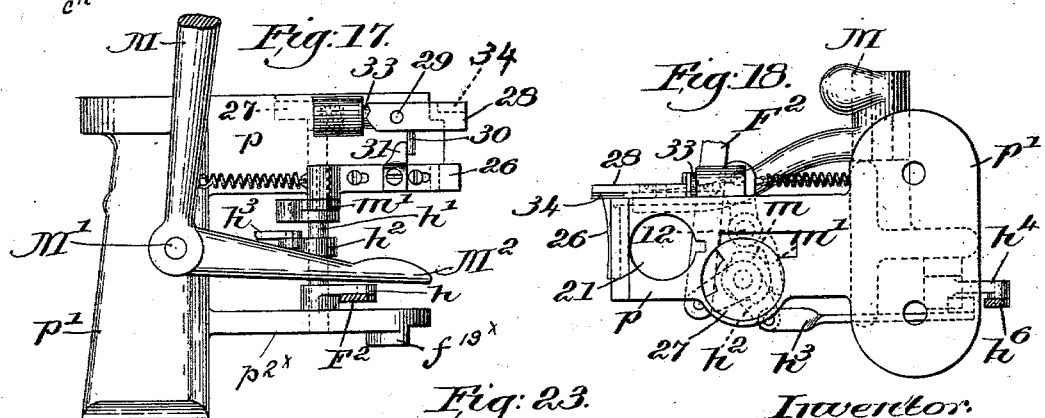
Witnesses: Inventor.
Edward F. Allen George D. Mayo.
Thomas J. Drummond by Crosby Gregory attys.

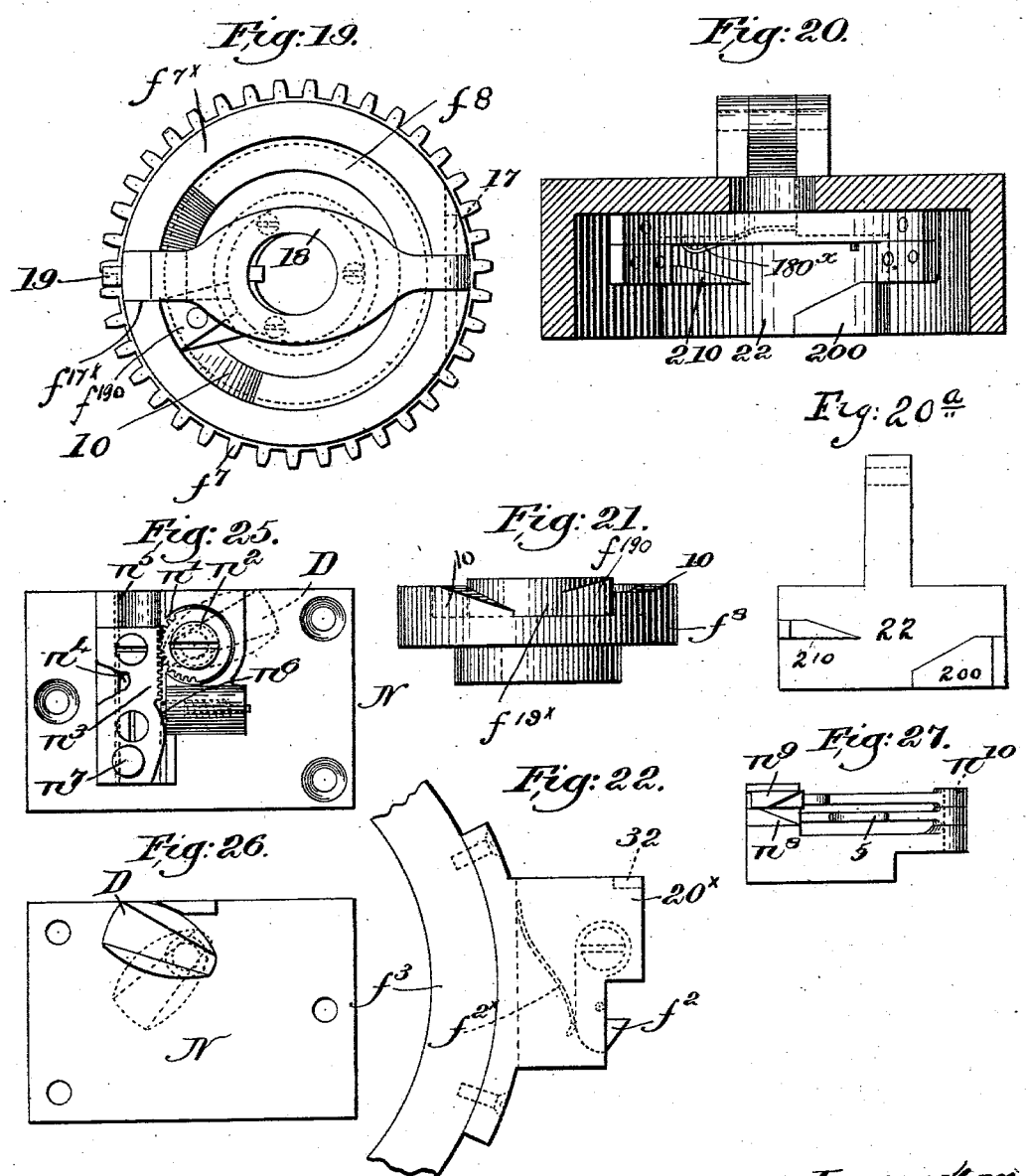

No. 745,449. Patented December 1, 1903.

UNITED STATES PATENT OFFICE.

GEORGE D. MAYO, OF FRANKLIN, NEW HAMPSHIRE, ASSIGNOR TO THE MAYO KNITTING MACHINE AND NEEDLE CO., OF FRANKLIN, NEW HAMPSHIRE.

KNITTING-MACHINE.

SPECIFICATION forming part of Letters Patent No. 745,449, dated December 1, 1903.

Application filed August 24, 1896. Serial No. 603,667. (No model.)

*To all whom it may concern:*

Be it known that I, GEORGE D. MAYO, of Franklin, in the county of Merrimack and State of New Hampshire, have invented an Improvement in Knitting-Machines, of which the following description, in connection with the accompanying drawings, is a specification, like characters on the drawings representing like parts.

This invention has for its object to improve that class of knitting-machines wherein a cam-cylinder has both a rotary and a reciprocating motion, the changes from one to the other motion to enable the circular part of a stocking and then the heel or toe part of a stocking to be knitted being made or effected entirely automatically. I have devised peculiar means whereby these changes from circular to reciprocating knitting are effected in a simple and positive manner. I have provided a novel pattern mechanism to effect the changes in the direction of motion of the cam-cylinder and the length of stitch not only in the leg to gradually tighten the stitches, but also to make one or more slack courses useful to the operator in picking the open end of the toe onto a seaming-machine and also, if desired, to make at a short distance therefrom one or more other slack courses to aid in separating the stockings knitted, one connected to another, and the pattern mechanism may also stop the machine at the completion of a stocking and control the time of movement of each of two thread-carriers.

The pattern mechanism referred to is actuated by pattern-gears, shown as on the shaft of the pattern mechanism, said gears having novel means for actuating them at a fast or slow speed to thus provide for effecting quickly any desired alteration in the length of the stocking with the same gears and pattern mechanism.

I have also provided the machine with two thread-carriers, preferably made as rings, each having its own independent thread, one to feed the needles when circular work is being done and the other to feed the needles when reciprocating knitting is being done, as for heel and toe work, thus making it possible to put a thread of a different size or color from that of the leg into the heel and toe, the said thread-carriers being sustained on a support shown as independent of the cam-cylinder, said support being so made that it may be raised and turned aside from above the top of the needles in the needle-cylinder when it is desired to put a rib-top onto a stocking to be knit. When circular work is being done, the thread-carrier having the heel and toe thread remains stationary. The thread-carrier having the thread for circular work is in this instance shown as located above the thread-carrier having the heel and toe thread. When circular work is being done, the thread-carrier carrying the thread for that work is rotated continuously with the cam-cylinder by devices located outside the cam-cylinder, said devices being preferably actuated by gear-teeth attached to the bottom of the cam-cylinder; but the said devices may be actuated from any other suitable parts of the machine. When circular knitting is discontinued, the circular movement of the thread-carrier then in use is stopped, and a latch operatively connected to the thread-carrier carrying the heel and toe thread is automatically engaged by an actuating device, shown as a projection, which has imparted to it a movement in unison with the cam-cylinder, which latter during heel and toe knitting has a reciprocal motion. In this instance of my invention the actuating device is carried by the cam-cylinder and is made movable thereon. The stopping of the thread-guide carrying the thread used for circular knitting is effected automatically at the proper times by or through devices to be described.

I have provided the machine with a clamp to automatically catch and hold the heel and toe thread whenever it is to be thrown out of action, thus preventing the accumulation of any slack thread which might get to the needles, the said clamp effecting the purpose of a tension device when the thread is being used.

Figure 7:
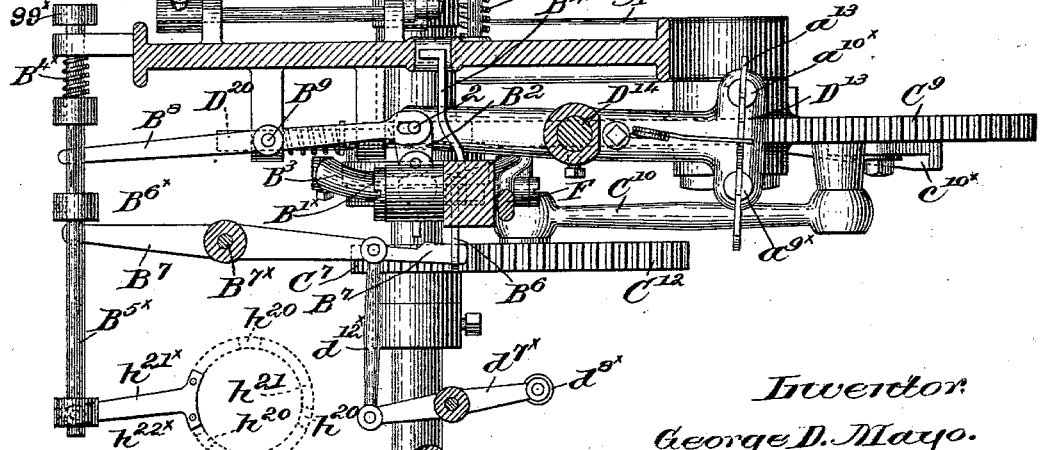

Figure 1 is a right-hand side view, partially broken out, of the upper part or head of a knitting-machine embodying my invention,

said view showing part of the table or bed on which the head rests; Fig. 1ᵃ, a sectional detail in the line $x^6$, Fig. 1. Fig. 2 is a right-hand elevation showing also the table or bed and the parts below it at that end of the machine. Fig. 2ᵃ shows detached the lever D⁷, represented in Fig. 2 partially by dotted lines. Fig. 3 is a section through the shaft E, showing the various devices mounted upon it. Fig. 4 is a partial rear view of the machine, or a view of the machine shown in Fig. 2 looking at it from the right. Fig. 5 is a detail showing the main shaft with devices thereon in section, together with devices for automatically stopping the machine. Fig. 6 is a section on the irregular dotted line $x$, Fig. 4, looking toward the right. Fig. 7 is a section looking down upon the parts shown in Fig. 6 below the table or bed-top, the latter being removed. Fig. 8 is a face view of the cam for raising and lowering the needle-cylinder, it being the first cam to the right on the shaft shown in Fig. 3. Fig. 9 is a section looking to the left of the dotted line $x'$. Fig. 9ᵃ shows a detail of $b^4$ acting on the edge of $b^{50}$. Fig. 10 is a section looking to the left of the dotted line $x^2$. Fig. 11 is a section looking to the left of the dotted line $x^3$. Fig. 12 is a section looking to the left of the dotted line $x^4$. Figs. 13 and 14 are views, but on a much smaller scale, of the acting faces of the two pattern-wheels at the left on shaft E, they being separated on the dotted line $x^5$ in opposite directions, Fig. 13 showing the inside of the loose wheel at the extremity of said shaft and Fig. 14 the fast wheel. Fig. 15 is a face view, enlarged, of a toothed wheel and cam to be described. Fig. 16 is a plan view of Fig. 1. Fig. 16ᵃ is a detail of the lever $c^{12\times}$, stop $c^{13\times}$, and ring $c^{24}$. Figs. 17 and 18 are details of the parts represented in Fig. 16 at the right. Fig. 19 is an enlarged plan view of the gear inside the cam-box and parts carried thereby. Fig. 20 is a sectional view of the cam-box referred to, showing its cam-gate. Fig. 20ᵃ is a detail of the cam-gate. Fig. 21 is a detail showing the cam device removed from the cam-box. Fig. 22 is a plan view, enlarged, showing part of the thread-carrier or ring carrying the heel and toe thread and its connected latch, which is engaged, as will be described, by means carried by the cam-cylinder during its reciprocation to reciprocate the said ring in heel and toe knitting. Fig. 23 is a sectional detail taken across the shaft $h'$, Fig. 1, just above the cam $m$ and the lever $m'$ chiefly to show the slide 26 and how it is actuated; Fig. 24, a front or left-hand end view of the slide 26, Fig. 23; Fig. 25, an enlarged view of the plate N detached from the cam-cylinder; Fig. 26, an inner side view of said plate and its switch; Fig. 27, an inner side view of the switch-shifters detached from the bed.

In the drawings, A represents a table or bed supported upon suitable legs A', which in practice rest upon the floor, the legs in this instance being broken off, the legs and table forming supports for the various devices to be described.

The main shaft $A^2$ is provided with two loose pulleys $A^3$ $A^4$, over which is extended a belt driven from any suitable source, the said belt being under the control of a shipper-fork $A^5$, connected to a slide $A^6$, having a guide $A^{6\times}$ running against a stud $A^{3\times}$, said block sliding on a stud $A^7$ (see Figs. 4 and 5) and being acted upon by a spring $A^8$ to keep the belt upon the outer one of the two loose pulleys, the belt being shifted from one to the other of said loose pulleys by means of a link $A^9$, connected to the block and to an arm $A^{10}$ of a rock-shaft $A^{12}$, mounted in bearings at the side of the machine and having a handle $A^{13}$, which may be moved by hand when the machine is to be started. When the handle $A^{13}$ has been turned in the direction of the arrow, Fig. 5, far enough to put the belt on the pulley $A^3$, the arm $A^{10}$ rests on or just above one arm of an elbow-lever $B^4$, pivoted on a stud $B^5$.

The link $A^9$ has an adjusting device $B^{60}$, which may be adjusted so as to strike the arm $A^{10}$ sooner or later after the pivot connecting the link and arm passes the line of center of the shaft $A^{12}$ to thus determine the ease of motion of the link.

The main shaft $A^2$ has fast on it a toothed gear $B^{10}$, (shown in Figs. 4 and 5 and by dotted lines in Fig. 2,) which engages a toothed gear $B^{12}$, (shown partially in Fig. 1 and by dotted lines in Fig. 2,) the said gear engaging in usual manner the bevel-toothed ring T, commonly found attached to the lower end of the usual cam-cylinder.

The main shaft $A^2$ has splined upon it the hub of a clutch $B^{13}$, (best shown in Figs. 4 and 5,) said hub being grooved externally to receive a two-part ring $C^\times$, one-half of said ring being shown in Fig. 5, each half having a suitable stud, as $C'$, (see Fig. 4,) which enters a hole in one of the forks of a clutch-arm $B^3$, pivoted at $B'^\times$, said clutch-arm being jointed by a link $B^2$ to a pin 2, located at the inner end of a clutch-lever $D^{13}$, pivoted at $D^{14}$ and provided with pattern-controlled pins or projections $a^{9\times}$ $a^{10\times}$.

The hub $B^{13}$ has at its sides pins $a$ $b$, each backed up by a suitable spring, so that the said pins normally project through plates or washers $a'$ $b'$, fast to the sides of the hub.

The shaft $A^2$ is surrounded by a bushing $C^4$, in turn surrounded by a collar $C^5$, the collar and bushing being fastened to the shaft by a screw $C^6$, the end of the bushing being surrounded by a loose gear $C^7$, having a hole to receive the pin $a$, the longitudinal movement of the gear on the hub being prevented by a flange at one end of the hub. The said shaft $A^2$ has also loose upon it at the opposite side of the said hub $B^{13}$ (see the left-hand side thereof in Fig. 5) a pinion $C^8$, which is secured to a sleeve of the loose pulley $A^3$, said pinion engaging and driving whenever the machine is in motion the large-toothed gear $C^9$, to be described, said pinion having a hole in its face to receive the pin $b$.

The gear $C^9$ has a crank-pin provided with a link $C^{10}$, which at its opposite end (see Fig. 6) is attached to a stud on a toothed segment $C^{12}$, pivoted at $C^{13}$, said segment engaging the loose gear $C^7$ and oscillating it continuously.

When the pin $b$ of the clutch-hub $B^{18}$ engages the gear $C^8$, the main shaft will be rotated for circular knitting and the segment will move the loose gear $C^7$ back and forth on its hub; but when the hub is shifted so that the pin $a$ of the clutch engages the gear $C^7$ the latter becomes fastened to the main shaft and the segment actuating said gear will oscillate the said shaft for reciprocating knitting for heel and toe work.

The main shaft $A^2$ has fast on it at one end (see Fig. 2) a pinion $D^\times$, which engages a toothed wheel $D'$, mounted on a stud $D^2$, (shown by dotted lines, Fig. 2,) said toothed wheel having connected to it by suitable screws $a^\times$ a slotted plate $a^2$, in which is adjustably mounted a crank-pin $D^3$, having attached to it a link $D^4$, in turn connected to the lower end of a pawl-carrier $D^5$, pivoted on a stud $a^4$, said pawl-carrier having an arm $a^3$, on which is mounted a spring-actuated pawl $a^5$, which normally engages the teeth of a ratchet-wheel $D^6$, which is the prime mover of the pattern-gears and pattern surface or mechanism to be described.

The crank-pin $D^3$ may be adjusted to control the stroke of the pawl $a^5$, so that it will move the said ratchet-wheel the distance of one or any desired number of teeth, the greater the movement of said ratchet-wheel the shorter the stocking, and vice versa, the ability to control the movement of the said ratchet-wheel enabling it to be used for any length of stocking.

The pawl $a^5$ has (see Figs. 2 and 4) a pin $a^6$, which when the knitting is to be changed from circular to heel and toe knitting, during which time the pattern-wheels $a^{19}$ $a^{20}$ are to be left at rest, is struck by one end of a lever $D^7$, connected by a link $D^8$ with an elbow-lever $D^9$, pivoted on the framework, said elbow-lever having attached to it a link $D^{10}$, pivoted at $D^{12}$ to a lug 4, projecting from the clutch-lever $D^{13}$, which latter is moved when the change from circular to reciprocating knitting is to be made, and vice versa, by the pattern mechanism.

The outer end of the clutch-lever $D^{13}$ is shown as bifurcated to embrace the wheel $C^9$, (see Figs. 2, 4, 6, and 7,) the bifurcated part being provided with the sliding pins $a^{9\times}$ $a^{10\times}$, referred to, each sliding pin being provided near one end with a projecting cross-pin, the cross-pins entering each its own inclined or cam slot $a^{11}$ $a^{12}$ in a sliding bar $a^{13}$, which is moved in one or the other direction, according as it is desired to change from circular to reciprocal knitting, and vice versa.

The bar $a^{13}$ has jointed to it a lever $a^{14\times}$, having its fulcrum on the pivot $D^{12}$, said lever $a^{14\times}$ having connected to it a link $a^{15}$, slotted at one end (see Fig. 4) to embrace and slide on a screw-stud $a^{16}$, carried by a change-lever $a^{17}$, it having, as shown, three arms and being pivoted at $a^{18}$ on a stand $a^{19\times}$, attached to the bed.

The shaft E and the parts surrounding it at the right of the frame A' (see Fig. 3) constitute what I denominate herein as a "pattern" mechanism.

The change-lever $a^{17}$ is acted upon at its right-hand end when the change from circular to reciprocal knitting is to be made by a latch $b^3$, forming part of the pattern mechanism, (see Figs. 4 and 9,) said latch being carried by a radius-bar $b'^\times$, mounted loosely on the hub $b^{5\times}$ of a disk $b^{50}$, fast on the shaft E, having as its bearing a short sleeve $c^3$, said radius-bar having an attached clamping-dog $b^4$, the acting edge of which is recessed to receive and bear against the periphery of the said disk frictionally with sufficient force to cause said bar to rotate with said disk and at the proper time strike said lever $a^{17}$. A spring $b^{60}$ acts on the latch $b^3$ to hold it normally away from the bar $b'^\times$.

The left-hand end of the change-lever $a^{17}$ is acted upon when the change from reciprocating knitting to circular knitting is to be made by (see Fig. 11) a latch $c^\times$, pivoted on a radius-bar $c'$, (shown by dotted lines in Fig. 11 and in full lines, Fig. 4, and in section, Fig. 3,) the hub of said arm surrounding the hub $c^{2\times}$ of a disk $c^2$, loose on the sleeve $c^3$, which is secured to the stand A', the said arm $c'$ being made adjustable about the said hub by a set-screw $c^4$ in a slot of said arm, (see Fig. 11,) a spring $c^5$ acting on said latch $c^\times$ to normally press it away from the arm $c'$.

The needles $n$ will be held in grooves in a needle-bed $a^2$, surrounded near its upper end by a ring $a^8$, having radial cross-grooves for the reception of a series of jacks or sinkers $a^{10}$, actuated by cams of a suitable sinker-ring $a^{14}$, having actuating-ears $a^{26}$, such as designated by like letters in Patent No. 461,357, dated October 13, 1891.

The cam-cylinder B is substantially the same as the cylinder designated by like letters in United States Patent No. 461,358, dated October 13, 1891, it being provided at its inner side with cams or devices for actuating the needles for circular and reciprocating knitting, a gate D for putting out of action the needles not to be used in knitting the heel or toe, and needle-elevators to engage the heels of and put up out of action at each narrowing course needles at the ends of the series of needles used in narrowing for the heel and toe, and needle-depressors $b^6$ to engage and pull down the needles at each widening course, and latches to coöperate with said elevators and depressors. Inasmuch as the cam-cylinder and its cams, elevators and depressors, and their latches, &c., are all fully shown in said Patent No. 461,357 and also in United States Patent No. 461,358, I have considered it unnecessary to herein show the same; but I have illustrated the switch and its actuating devices, for they differ from the devices of the said patent.

The switch D for pulling up the needles not to be used for reciprocal knitting and for putting them down when again to be used has (see Fig. 25) its stem passed through a plate N, attached to the outer side of the cam-cylinder B, and said stem outside said plate has feather-splined on it a gear $n'$, which is kept on the stem by a screw $n^2$, said gear being engaged by the teeth of rack $n^3$, shown as connected to a slide-block $n^4$, fitted into a guideway $n^5$ of the said plate, said rack when raised or lowered turning said switch, the rack being raised to move the switch to put up those needles which are not to be used for heel or toe knitting, said rack being lowered to put the switch in position after a heel or toe has been finished to pull down all the needles previously lifted and then to be used in circular knitting. The rack has a suitable cam-face at one side, with which coöperates a locking device $n^6$, shown as a spring-pin, said locking device holding the rack in the position in which it may be left by its actuating device. This rack has a projecting pin $n^7$, (see Fig. 25,) which preparatory to narrowing is struck by the lower one of a pair of switch-shifters $n^8$ $n^9$, (see Figs. 16 and 27,) said shifters being shown as levers pivoted at $n^{10}$, one shifter resting above the other and each being acted upon by a suitable spring $n^{12}$, which acts to normally keep the acting ends of the shifters pressed toward the cam-cylinder.

The lowermost switch-shifter $n^8$ has a space 5, into which enters a projection $n^{13}$, carried by the shifter-ring $c^{24}$, said ring having given to it a slight movement in the direction of the arrow on it, Fig. 16, just as the change from circular to reciprocating knitting is to be effected, the arrival of the said projection opposite said notch letting one of the springs, $n^{12}$, move the cam-shaped end of said shifter $n^8$ into the path of movement of said pin $n^7$, and at the same time said projection $n^{13}$ acts against and moves the uppermost shifter in the opposite direction. After the heel or toe has been completed the ring $c^{24}$ is moved in the opposite direction, causing the said projection $n^{13}$ to act on and move outwardly the shifter $n^8$ and let the shifter $n^9$ come into action to strike the upper side of said pin $n^7$ and move the rack and switch D to put all the needles again into position for circular knitting.

The elevator-latches referred to have projecting pins $o$ $o$, and the depressor-latches, herein shown and lettered $b^6$, have projecting pins 4, which at times are struck by cam-posts which are permitted to come into operative position by the change in position of the shifter-ring $c^{24}$, all as in said patent. For instance, when the endmost needles engaged in heel and toe work are to be raised at the end of each course in usual manner for narrowing the cam-post $c^{122}$ is put in operative position to be struck by the pins $o$ $o$ of the latches coöperating with the elevators, and when the said needles are to be drawn down for widening the cam-post $d^{15}$ is put in place in order that it may be struck by the pins 4 4, projecting from the latches coöperating with the depressors, both and all common to said Patent No. 461,357. The cam-posts $c^{122}$ and $d^{15}$ are found substantially in said Patent No. 461,357; but herein I employ one cam-post instead of two, each containing a double-acting face, said cam-posts being pivotally mounted on the bed or table-top of the machine and acted upon by suitable springs to keep them pressed toward the actuating cam-plates $c^{23}$ $d^{21}$, attached to the ring $c^{24}$, said ring and cam-plates being common to said Patent No. 461,357 and Patent No. 461,358. The ring $c^{24}$ when narrowing is to be done is moved for a distance sufficient to cause cam $c^{22}$ to release cam-posts $c^{122}$ and permit it to come into working position, the cam-ring being arrested at the end of its first movement by the lever $c^{12\times}$, to be described, and when the narrowing is completed and widening is to be done the said lever $c^{12\times}$ is moved to release the stop $c^{13\times}$ on said ring, so that it will have imparted to it further movement in the direction of the arrow thereon by the spring $c^{14\times}$, causes the cam $d^{21}$ to release cam-post $d^{15}$, putting it in working position, cam-post $c^{122}$ remaining in its operative position. After the widening has been completed, the ring $c^{24}$ is positively moved backward into its full-line position, Fig. 16, at one movement of the cam $F^6$.

At the right-hand side of the disk $c^2$, and herein shown as forming part of it, is a cam $c^6$, which acts on a rod $c^7$ (see Figs. 4 and 11) and moves it to actuate a thread-cutting mechanism, (not shown,) which may be of usual construction, it not being herein claimed. A ratchet-wheel $c^9$, having a laterally-extended peripheral flange, is connected to the disk $c^2$ by suitable bolts $c^{5\times}$.

The flange of the ratchet-wheel $c^9$ has a bevel-pointed pin $c^{10\times}$, (see dotted lines, Fig. 10, and full lines, Fig. 4,) which immediately after narrowing acts on and lifts a rod $c^{12}$, causing it to move a holding-lever $c^{12\times}$, which engages the left-hand side of a projection $c^{13\times}$, fast on the ring $c^{24}$ at the right of the cam $c^{27}$, and lets the spring $c^{14\times}$ act for the second time to draw the ring $c^{24}$ in the direction of the arrow on it far enough to cause cam $d^{21}$ to release the cam-post $d^{15}$ and let it come into position to be struck by the pins 4 4 of the latches coöperating with the depressors.

The ratchet-wheel $c^9$ of the pattern mechanism (see Figs. 3 and 10) derives its movement from a pawl-carrying lever $c^{13}$, mounted loosely on the sleeve $c^3$, said lever having mounted upon it a spring-controlled pawl $c^{14}$ and a latch $c^{15}$, the latter resting normally against a stop-pin $c^{17}$. The upper end of the pawl-carrying lever $c^{13}$ is acted upon by a spring $c^{18}$, attached to the frame, and the backward stroke of the pawl $c^{14}$ is determined by an adjusting stud or device $c^{19}$, also in the frame.

When the gear $B^{10}$ is moving in the direction of the arrow on it, Fig. 15, circular knitting being then effected, the projection $c^{20}$, (shown by dotted lines, Fig. 15,) attached to said gear, strikes the latch $c^{15}$ and turns it about its pivot; but when said gear $B^{10}$ is moving in the opposite direction during reciprocating knitting then the said projection meets the right-hand side of the latch $c^{15}$ (see Fig. 10) and moves the pawl-carrying lever and pawl, causing the ratchet to be fed around during reciprocating knitting and carry with it the disk $c^2$ and arm $c'$ and latch $c^\times$ until said latch meets the change-lever $a^{17}$.

The outer or right-hand end of the shaft E has loose on it a toothed pattern-wheel $a^{20}$, (see Figs. 2, 3, 4, and 13,) some of the teeth being cut away to constitute a mutilated wheel, said wheel having adjustably attached to its inner side a segmental plate $a^{22}$, having in this instance three teeth and having also a pin $a^{24}$. Fast on said shaft alongside said wheel is a second pattern-wheel $a^{19}$, (see Figs. 3, 4, and 14,) it having also mutilated teeth and a pin $a^{23}$. The said wheels are both engaged by a wide pinion $a^{78}$, which moves them as described in Patent No. 474,671, dated May 10, 1892, wherein said wheels (designated by like letters) are fully shown and described, they being used to move the pattern mechanism at the proper speed and time to determine the times at which the motion of the cam-cylinder is changed, and consequently determine the length of the leg and foot of the stocking. The time that the wheel $a^{19}$ and the shaft E and its connected parts remain idle controls the length of the leg of the stocking being knitted, substantially as provided for in said patent. Both wheels $a^{20}$ and $a^{19}$ have, as herein shown, smooth peripheral portions $a^{19\times}$ $a^{20\times}$ alongside of their toothed portions, against which act suitable spring-pressed brakes or shoes $E^6$, both alike, they serving to hold the said gears when not to be positively actuated.

The wheel $a^{19}$, fixed to the shaft E, remains idle for a longer or shorter period, that depending upon the length of the leg of the stocking to be knitted, and when $a^{19}$ is idle the shaft E and its attached parts are at rest; but during this time the wheel $a^{20}$ is moved, it continuing to move until the shoulder of the segmental plate $a^{22}$ meets the pin $a^{23}$, extended from the wheel $a^{19}$, and thereafter the wheel $a^{20}$ takes up with it the wheel $a^{19}$, and both wheels are moved together to again turn the shaft E to make the changes necessary to effect the narrowing and widening or fashioning operations described.

The shaft E remains at rest while the heel is being finished, and then the shaft E is again revolved until the foot of the stocking is completed, when the shaft is again left at rest while the toe is being knitted.

The wheel $a^{20}$ is stopped as soon as its toothless space arrives opposite the broad pinion $a^{78}$, the wheel $a^{19}$ thereafter continuing to rotate until its toothless space comes opposite said pinion.

The inner end of the shaft E has fast on it a disk $d$, the hub of which is surrounded by the inner end of an arm $d'$, which is extended from the shaft E in a direction opposite the arm $b'^\times$, said arm having an attached clamping-dog $d^2$ and carrying a latch $d^3$, actuated by a suitable spring $d^4$, which keeps it normally toward a stop $d^5$, the said arm $d'$ traveling with the disk $d$ during circular knitting by reason of the friction of the dog $d^2$ against it, and when circular knitting is to be changed to reciprocating knitting said dog $d^3$ in its movement contacts with the right-hand end (see Fig. 4) of the change-lever $a^{17}$, moving it, as described, to shift the bar $a^{13}$ and move it in the direction to effect the engagement of the clutch $B^{13}$ with the loose gear $C^7$, it being reciprocated constantly by the segment $C^{12}$, so that said segment thereafter becomes the driver for the knitting parts during reciprocating knitting.

The disk $b^{50}$ has connected to one side of it by a suitable screw (see Fig. 3) a plate $e^3$, (shown also by dotted lines, Fig. 9,) said plate having one or more groups of ratchet-teeth $a^{32}$ $a^{32\times}$, which are adapted to be engaged by a pawl $e'$. The pawl $e'$ is pivoted on a pawl-carrier $e$, loosely mounted on the hub of the plate $b^{50}$, said carrier being provided with a roller or other stud $e^4$, which is kept in contact with a cam $e^5$ on the wheel $B^{10}$ by a spring $e^6$, said wheel rotating in unison with the cam-cylinder, the said pawl at times engaging the teeth $a^{32}$ and $a^{32\times}$ referred to.

The disk $d$ and plate $b^{50}$ are both connected to the shaft E and move together.

The disk $d$ carries at its outer side a cam $d^6$, and said disk has attached to it by a screw $d^7$ a plate $d^8$, having a cam $d^9$, said plate being adjustable on the disk $d$, so that the distance apart of the cams $d^6$ and $d^9$ may be adjusted.

The acting end of the cam $d^6$ is quite abrupt, as shown at $d^{6\times}$, Figs. 3 and 4, and at the rear of said abrupt end is a high part 12, and at a short distance from said high part is a second like abrupt incline and high part to be described.

The elbow-lever $B^4$ has connected to it a slotted link $B^6$, in which is placed one end of the tension-lever $B^7$, (see Fig. 7,) pivoted at $B^{7\times}$, said lever being moved, as described, by the high part 12 at the completion of each stocking to turn the arm $B^4$ and cause it to act on $A^{10}$ and turn it far enough to let the spring $A^8$ act to put the belt on the outermost loose pulley and stop the machine.

Just as a stocking is finished, if the machine is to be stopped, the first abrupt end of the cam meets a roller or other stud $d^{8\times}$ on a pivoted lever $d^{7\times}$, connected by link $d^{12\times}$ (see Fig. 7) to and to move the lever $B^7$ and through the link $B^6$ turn the arm $B^4$ to effect the transfer of the driving-belt onto the outermost loose pulley $A^4$, and the said roller-stud stops on the cam $d^6$ just behind the high part 12 in position to start the machine.

Herein, as in the Patent No. 461,357, the lower end of the needle-cylinder will be provided with notches which will rest on a ring $h^{21}$, provided with projections $h^{20}$, and said ring has a connected handle $h^{22\times}$, which is pivoted to a block $h^{22\times}$ on a rod $B^{5\times}$, the movement of said rod operating said ring to raise or lower the needle-cylinder to lengthen or shorten the stitches.

When a stocking is to be started, the stitches in the larger part of the leg should be a little looser or longer than in the lower part of the leg and the foot, and the roller or other stud $d^{8\times}$ will consequently stand on the lower part of the cam $d^6$ just beyond the second high part 12, and in such condition the lever $B^7$ acts against the collar $B^{6\times}$ and compresses somewhat the spring $B^{4\times}$, and as the knitting progresses the said cam travels over said roller, and when the leg should begin to be contracted the roller $d^{8\times}$ comes onto the inclined part $d^{90}$ (see Fig. 4) of the cam $d^9$, and as said cam travels over the said roller the lever is gradually moved with relation to said collar $B^{6\times}$ as to let the spring $B^{4\times}$ gradually move the rod $B^{5\times}$, and with it the lever $h^{21\times}$, enabling the projection $h^{20}$ on the ring $h^{21}$ to enter the notch in the lower end of the needle-cylinder and let the said cylinder descend into the position for the shortest stitches to be made, the extent of movement of said rod being limited by the collar $99^{\times}$. At or about as the toe is completed, the first most abrupt end of the cam $d^6$ meets the roller or other stud $d^{8\times}$, and just at this time the lever $e$ is moved, causing the pawl $e'$ to engage the ratchet-teeth $a^{32}$ of the plate $e^3$, before referred to, to thus impart to the plate $d$ a quicker movement than would be effected by the gear-wheels, thus giving to the levers $d^{7\times}$ and $B^7$ quick movements, causing the outer end of the lever $B^7$ to act upon said collar $B^{6\times}$ and push the rod $B^{5\times}$ in opposition to the spring $B^{4\times}$ and cause said rod to turn the needle-cylinder-elevating ring $h^{21}$, to thus lift said cylinder quickly to provide for stitches of the greatest length, and as the roller or other stud passes over the high part 12 some longer stitches will be made for a slack course. When the abrupt part of the cam was operated, as described, to act on and move the lever $d^{7\times}$, the ratchet-teeth $a^{32}$ had just arrived in position to be engaged by the pawl $e'$, and engaging said teeth it gave to the shaft E, its attached disk, and cam part $d^{6\times}$ a quick movement, or a movement faster than that at which it previously moved, to thus cause said abrupt part and part 12 to act quickly and form but one or more slack courses before stopping the machine. The slack course first referred to will be useful to the operator who closes the toe, as it forms a line to indicate where the loops may be put onto the seaming-machine used to close the toe. The machine having been stopped and the stocking run off, it may be again started, and if the stocking is to be short and knitted to a rib top then but one abrupt part $d^{6\times}$ and high part 12 will be needed; but in case it is desired to knit stockings connected together we remove the link $B^6$ and apply to the cam $d^6$ two abrupt parts and high parts, as shown in the drawings, and a second set or pair of teeth, as $a^{32\times}$, (see Fig. 9,) so that after one or more regular courses have been knitted we may again raise the needle-cylinder to make a second slack course, by means of which to accurately separate or sever the leg of one stocking from the toe of a previously-knitted stocking, and then the knitting will continue until the stocking is ended, when the action described will be repeated.

The ratchet-plate $e^3$, aside from its teeth $a^{32}$ and $a^{32\times}$, presents a smooth periphery, and hence the pawl $e'$ of the arm $e$ does not operate to turn the plate $e^3$ until in the rotation of the shaft E with its plate $d$ said teeth are put into position to be acted upon by said pawl.

The plate $c^2$ has attached to it by a screw $e^7$ a block $e^8$, to which is secured in an adjustable manner a brake or friction strap $e^9$, which surrounds the sleeve $c^3$, thus preventing undue movement of the said plate $c^2$ and its attached parts on the shaft E.

The end of the clutch-lever is shown as bifurcated to embrace the large gear $C^9$, which has adjustably secured to it on opposite sides cam-lugs $c^{10\times} c^{11\times}$, said lugs meeting that one of the pins $a^{9\times}$ or $a^{10\times}$ whichever may be dropped or depressed by the movement of the cam-plate $a^{13}$, thus moving the said lever $D^{13}$ in one or the other direction. The pins carried by the lever $D^{13}$ and which may be changed in their positions by or through the action of a pattern-surface, so that by striking the said pins the said lever may be moved in one or the other direction, as desired, to change from circular to reciprocal knitting, and vice versa, is an important feature of this invention.

The inner end of the lever $D^{13}$ is joined by the link $B^2$ to the clutch-arm $B^3$, and as the lever $D^{13}$ is moved it moves the clutch-arm $B^3$ in one or the other direction, and the extreme outer end of said lever $D^{13}$ in its lateral movement strikes and passes the pointed end of a spring-pressed pin $D^{20}$, (see Fig. 6,) thus holding the lever $D^{13}$ in the position in which it may be left by the cam-lugs.

The forked end of the clutch-lever $B^3$ has a stud $C'$, which is engaged by a lever F, free to turn on a pivot $F'$, said lever being extended through a slot in the bed A. The lever F will be turned in one direction when reciprocating knitting is to be done and in the opposite direction when reciprocating knitting is to be stopped. The lever F has connected to its upper end a link $F^2$ and a second link $F^3$, (see Fig. 16,) which is joined to lever $F^4$, shown as of elbow shape, said lever being connected by a link $F^5$ to and so as to become the mover of the trip $F^6$, which by acting against the lug $F^7$ on the ring $C^{24}$ moves the latter in a direction opposite the said arrow when circular knitting is to be commenced, said trip standing in the position shown in Fig. 16 during circular knitting, but being moved positively in a direction to release said lug and let the spring $c^{14\times}$ assume control of and to move it preparatory to commencing reciprocating knitting. The ring $c^{24}$ has in addition to the cam-plates $c^{23}$ and $d^{21}$ and block $c^{13\times}$ a cam-plate $c^{27}$. The cam $c^{27}$ when the ring $c^{24}$ is moved in the direction of the arrow on it to enable reciprocating knitting to be done releases the cam-post $f$ and permits it to put into operation the actuating means for moving the thread-carrier used for reciprocating knitting. The said actuating means is herein shown as a slide $f'$, having a pin 8 and embracing a guide $f'^\times$, (see Fig. 1,) the elevation of the slide causing a projection at its upper end to be put in position to be engaged by a latch $f^2$, (see Fig. 22,) attached to the thread-carrier $f^3$ for the heel and toe thread, said ring having at its upper end (see Fig. 1) an outturned flange which, as herein shown, rests on an inturned flange of a thread-carrier support or case $f^4$, having a hub 20, (see Fig. 1,) provided with a spline to enter a hole 21 in a stand $p$, the hub setting outside of a shaft $f^9$, the spline being a short one, so that it will not prevent the turning of said hub on said shaft when the hub is lifted.

The slide and latch constitute what I designate as the actuating device for the thread-carrier $f^3$.

The case $f^4$ is supported as described in order that it may be lifted and turned aside from the top of the usual needle-bed when it is desired to use the machine for knitting half-hose, wherein a rib-top is to be transferred onto the needles preparatory to commencing the knitting of the stocking. To lift the said case, I have provided a hand-operated lever M, pivoted at M', the short arm $M^2$ of said lever lying just under the said hub 20. (See Fig. 1.) The stand $p'$, suitably connected by screws $p^\times$ (see Fig. 16) to the bed A, supports the shafts $f^9$ and $h'$ and also has secured to it by screws $p^4$ the standard $p^2$. The lower end of the shaft $f^9$ enters a bearing $f^{19\times}$ in an arm $p^{2\times}$, extended from the stand $p'$, (see Figs. 1 and 17,) a collar 98, fast on said shaft, meeting said arm. The thread-carrier support $f^4$ also serves to sustain a thread carrier or ring $f^5$, which carries the thread $f^{5\times}$ used in circular knitting, said carrier $f^5$ being herein shown as resting in said case just above the carrier or ring $f^3$ and being retained in the frame or case by an annular cover $f^6$. The outturned flange of the carrier or ring $f^5$ is toothed, (see Figs. 1 and 16,) and said teeth are engaged by the teeth of a gear $f^7$, normally loose on the hub of a circular or cam plate $f^8$, splined on the said shaft $f^9$, (see Fig. 1,) sustained in the frame $p$, said cam-plate rotating with said shaft and being free to slide thereon as required. The plate $f^8$ has at its upper side a rib, which is cut out partially to leave a cam-surface 10, and at the bottom of said cam, at one side, there is a notch $f^{19\times}$, the opposite side of said notch being filled in with a block $f^{190}$ to thus constitute a shoulder to engage the disengaging-latch 18 when said latch enters said notch, said latch entering said notch when the toothed ring $f^{7\times}$ is to be rotated to thus rotate with it the thread carrier or ring $f^5$. When the latch 18 is lifted from its engagement with the notch $f^{19\times}$, it rests on the higher part of the rib of the cam $f^8$; but when the latch is to engage the said notch $f^{19\times}$ the cam 10 permits it to ride easily down into the said notch, and said cam also somewhat aids the raising of the latch from its engagement with the cam $f^8$, after, however, the latch has been started upwardly. The shaft $f^9$ has at its lower end a gear $g$, which engages and is rotated by the teeth of the gear T, fast on the lower end of the cam-cylinder B, (see Fig. 1,) said shaft $f^9$ thus participating in all the movements of the cylinder B.

The gear $f^7$ has extended upwardly from its top side a nearly-circular wall $f^{7\times}$, notched at substantially diametrically opposite points, one of said notches $f^{17}$, (see Fig. 19,) the opposite notch in said gear having pivoted in it by a pivot 17 one end of a disengaging-latch 18, the opposite downturned end of which enters the notch $f^{17\times}$, the said opposite end having also a projection 19, which at times may be acted upon by cams 200 and 210, attached to a gate 22 of a stationary cam box or cover surrounding the said gear and camplate and loose on the shaft $f^9$.

During circular knitting the shaft $f^9$ is rotated continuously, and the loose gear $f^7$ in operative engagement with the teeth of the thread carrier or ring $f^5$ is clutched to the arm $f^8$ by the latch 18, thus rotating said ring $f^5$ for circular knitting, and at such time the gate is opened, as shown in Fig. 1, it thus releasing the disengaging-latch, so that it may drop and enter the notch $f^{19\times}$. During circular knitting the gate is held open by a lever 24, pivoted at 25, the upper end of said lever, as herein shown, entering a staple $26^\times$, attached to the said gate, the inner lower end of said lever, much the heaviest, resting on the face of a disk 27, provided with a notch, (see Fig. 18,) a spring $28^\times$ (see Fig. 1) acting on said lever to keep it down on said disk. The heavier end of said lever enters the notch of the disk 27 just about as reciprocal knitting is to be commenced, and as the lever moves it closes the said gate and brings the cams 200 and 210, attached thereto, in such position that the cam 200 acts on the end 19 of the latch 18 and partially lifts it to release the cam $f^8$, and at the same time the clutch $B^{13}$ is shifted to effect the oscillation of the main shaft for reciprocal knitting, and consequently the cam-cylinder after having moved the shaft $f^9$ in one direction reverses said shaft, and in its reverse movement the cam 210 of the gate catches under the partially-raised end 19 of the disengaging-latch and lifts it fully from engagement with the cam $f^8$, thus freeing the gear $f^7$ from the control of the said cam and enabling the said cam to reciprocate with the shaft $f^9$, but without rotating the said gear, and the thread carrier or ring $f^5$ is left at rest. The latch 18 when lying on the top of the cam 210 is frictionally held by a spring $180^\times$. As the cam 200 acts on the disengaging-latch the cam-plate $c^{27}$ acts to release the lever $f$, so that its upper end comes in range of and is struck by the pin 8 of the slide $f'$, thus lifting it into position to be engaged and held by the latch $f^2$, acted upon by a spring $f^{2\times}$, said latch being pivoted upon a projection $20^\times$, connected to the thread carrier or ring $f^3$, carrying the heel and toe thread, and as soon as the cam-cylinder and the said ring are coupled together, as described, the said thread carrier or ring is reciprocated with the said cam-cylinder.
The link $F^2$, before described, (see Fig. 16,) has its inner end connected to an arm $h$, fast on the vertical rock-shaft $h'$, said shaft having a second arm $h^2$, to which is joined a link $h^3$, in turn shown as connected, by two elbow-levers $h^4$ $h^5$, a link $h^6$, and a short rod $h^7$, with a cam $h^8$, which actuates a clamp-lever $h^9$ through a spring $h^{10}$, said clamp-lever being pivoted at $h^{12}$ and being cut away to embrace the enlarged end of a short stud $h^{13}$, to which is fixed an elbow-lever $h^{14}$ $h^{16}$ (see Figs. 1 and $1^a$) and having its bearing in a part of the standard $p^2$, one arm $h^{14}$ of said lever having adjustably attached to it a take-up device $h^{15}$, acted upon by a suitable spring $h^{15\times}$, engaging at its free end a rod $h^{16\times}$, projecting from the other or toe arm $h^{16}$ of said lever, the latter arm being so located as to act on a pin $h^{17}$, having attached to its lower end one member of a thread clamp or tension device $h^{18}$, the upper member $h^{19}$ thereof being fixed to a short tubular guide $h^{30}$, attached to the stationary frame arm $p^{21}$.

The pin $h^{17}$ has a suitable shoulder, (see dotted lines, Fig. 1,) which rests on a spiral spring $h^{22}$, located in said tube, the spring normally acting to keep the clamp closed on the thread used to knit the heel and toe; but in case of excessive strain on the said thread the take-up lever as it is drawn down causes the toe $h^{16}$ to act on and depress the pin $h^{17}$ and open the clamp to permit the thread to pass freely.

The rock-shaft $h'$ has a cam $m$, (see Figs. 1, 18, and 23,) which operates a lever $m'$, said lever being pivoted at 12 and having its opposite end pin-jointed to an L-shaped slide 26, (see Figs. 23 and 24,) said slide having at its under side, near its outer end, a beveled or inclined part $27^\times$, (see also Fig. 1,) the said slide preparatory to again commencing circular knitting being moved to put its inclined portion in line with the upper side of the pin 8 to thus depress the slide $f'$ and disconnect the thread carrier or ring $f^3$, leaving it at rest, and this done the gate 22 is immediately opened to enable the clutch 18 to again operate and start the ring $f^5$ for circular knitting. While at rest, the ring $f^3$ must be held or restrained from movement. This is effected by a stop 28, (see Figs. 17 and 18,) said stop being pivoted at 29 and having a pin 30, which is acted upon by a lug 31, carried by said slide 26, said stop in said Figs. 17 and 18 being in the position it will occupy when it acts to hold the ring $f^3$, the end of the said stop at such time acting against the beveled portion 32 of the projection $20^\times$ of the said ring. The stop 28 is held in one or the other of its two positions by a spring-pressed pin 33, engaging the pointed or notched end of said stop.

When the ring $f^3$ was to be moved for reciprocal knitting, the slide 26 was retracted and its lug was retired from the pin 30, and at substantially the same time the slide $f'$ was raised to engage the latch $f^2$ to start the said ring, and as it started the beveled portion 32 acted against the beveled portion 34 of the stop 28 to depress said stop and turn it on its pivot.

When the change is to be made from reciprocal to circular knitting, at which time the take-up is not needed, the cam $h^8$ is turned in the direction to cause its part of greatest throw to act on the spring $h^{10}$ and cause the lever $h^9$ to clamp the stud $h^{13}$ and hold the take-up stationary and inactive wherever left, as in Fig. 1.

To adapt the machine herein shown for the knitting of stockings to be separated after having been taken from the machine, it is only necessary to remove the link $B^6$, connecting the lever $B^7$ to the elbow-lever $B^4$. Now to use the machine to knit socks to rib-tops the said link will be again put back and the cam portion $d^6$ removed and another one substituted for it having but one abrupt part and high place.

Having described my invention, what I claim, and desire to secure by Letters Patent, is—

1. A knitting-machine containing the following instrumentalities, viz: a needle-cylinder to contain a series of needles, a single cam-cylinder having suitable cams to actuate said needles, means to rotate said cam-cylinder continuously; a circular stationary thread-carrier support surrounding the vertical plane in which the needles reciprocate; a ring-like thread-carrier mounted to turn thereon, it also surrounding the vertical plane in which said needles reciprocate; said thread-carrier supplying thread to said needles only while circular knitting is being done; and independent means to rotate said thread-carrier on said support for circular knitting, substantially as described.

2. A knitting-machine containing the following instrumentalities, viz: a needle-cylinder to contain a series of needles, a single cam-cylinder having suitable cams to actuate said needles, means to reciprocate said cam-cylinder, a thread-carrier support, having a bearing in a plane through which the needles work, a thread-carrier made as a ring independent of and movable in the bearing of said support to supply thread to said needles while reciprocating knitting is being done, and actuating devices carried by said cam-cylinder and adapted to temporarily engage said ring and reciprocate it on said support for reciprocating knitting, substantially as described.

3. A knitting-machine containing the following instrumentalities, viz: a needle-cylinder to contain a series of needles, a single cam-cylinder provided with suitable cams for actuating the needles both for circular and for reciprocating knitting, means to rotate said cam-cylinder, two independent thread-carriers made as rings, one adapted to supply thread to the needles for circular knitting, and the other to supply a different thread to the said needles for reciprocating knitting and actuating means to engage and operate first one and then the other of said thread-guides, each of said thread-guides having periods of operation and of rest, substantially as described.

4. A knitting-machine containing the following instrumentalities, viz: a needle-bed to contain a series of needles; a cam-cylinder to move said needles; means to rotate and reciprocate said cam-cylinder for circular and for reciprocating knitting; a thread-carrier entirely disconnected from the cam-cylinder and made as a hollow toothed ring and adapted to supply to the needles the thread to be used for circular knitting; a toothed gear engaging said toothed ring; means to rotate said gear to rotate said ring; a second thread-carrier to be used only in reciprocating knitting; means to disconnect and render said gear inoperative when reciprocating knitting is to be done, and means to actuate said thread-carrier for reciprocating knitting, substantially as described.

5. A knitting-machine containing the following instrumentalities, viz: a needle-bed to contain a series of needles, a cam-cylinder to reciprocate said needles, means to reciprocate said cam-cylinder, a thread-carrier support having a circular bearing in a plane through which the needles reciprocate, a thread-carrier made as a ring independent of the support and movable in said bearing to present a thread for heel and toe knitting, and means to connect said cam-cylinder and ring only while the said cam-cylinder is being reciprocated for reciprocating knitting, substantially as described.

6. A knitting-machine containing the following instrumentalities, viz: a needle-bed to contain a series of needles; a cam-cylinder, means to reciprocate and rotate said cylinder to actuate said needles, a thread-carrier made as a ring to present thread to the said needles during reciprocating knitting, actuating means to engage and move said ring in unison with said cam-cylinder during reciprocating knitting, and devices to move said actuating means and leave said ring at rest while the said cam-cylinder is being rotated, substantially as described.

7. The cam-cylinder, its grooved switch to move out of and into action those needles not to be used for reciprocating knitting and two independent pivoted horizontally-movable spring-controlled switch-shifters, combined with means to put one or the other of said switch-shifters into operative position, and means between said switch-shifters and said switch, said means including a rack and pinion, and actuated by said shifters to actuate said switch in one or the other direction at the desired time, substantially as described.

8. In a knitting-machine, the combination of a needle-cylinder to contain a series of needles, a cam-cylinder for actuating said needles, a lifting-ring $h^{21}$ on which the needle-cylinder rests, a shaft E carrying a disk provided with an attached toothed plate, a lever-and-pawl mechanism for rotating said shaft through the toothed plate, a plate $d$ having a shouldered cam on the face thereof and a lever and slide disposed between the plate $d$ and the ring $h^{21}$ for turning the latter under the action of the shouldered cam.

In testimony whereof I have signed my name to this specification in the presence of two subscribing witnesses.

GEORGE D. MAYO.

Witnesses:
 E. B. S. SANBORN,
 CHAS. G. GREENE.